US011519795B2

(12) United States Patent
Ma et al.

(10) Patent No.: US 11,519,795 B2
(45) Date of Patent: Dec. 6, 2022

(54) SYSTEMS AND METHODS FOR CALIBRATING TEMPERATURE SENSORS

(71) Applicant: NXP USA, INC., Austin, TX (US)

(72) Inventors: Xu Jason Ma, Chandler, AZ (US); Elie A. Maalouf, Mesa, AZ (US)

(73) Assignee: NXP USA, Inc., Austin, TX (US)

( * ) Notice: Subject to any disclaimer, the term of this patent is extended or adjusted under 35 U.S.C. 154(b) by 525 days.

(21) Appl. No.: 16/581,659

(22) Filed: Sep. 24, 2019

(65) Prior Publication Data

US 2021/0088389 A1 Mar. 25, 2021

(51) Int. Cl.
*G01K 15/00* (2006.01)
*G05F 1/10* (2006.01)
*G01K 3/00* (2006.01)
*G01K 7/02* (2021.01)

(52) U.S. Cl.
CPC .......... *G01K 15/005* (2013.01); *G01K 3/005* (2013.01); *G05F 1/10* (2013.01); *G01K 7/021* (2013.01)

(58) Field of Classification Search
CPC ...... G01K 15/005; G01K 3/005; G01K 7/021; G05F 1/10; G01R 31/2642; G01R 19/00
USPC .................... 374/170, 178, 120; 340/870.17; 327/512, 513; 702/99
See application file for complete search history.

(56) References Cited

U.S. PATENT DOCUMENTS

| 5,085,526 A | 2/1992 | Sawtell et al. | |
| 7,342,455 B2 * | 3/2008 | Behzad | H03F 1/0205 |
| | | | 455/73 |
| 10,483,023 B1 * | 11/2019 | Itani | H01C 10/16 |
| 2010/0007404 A1 * | 1/2010 | Hwang | G01K 7/01 |
| | | | 327/512 |
| 2012/0086494 A1 * | 4/2012 | Asada | H04L 25/03878 |
| | | | 327/307 |
| 2013/0120930 A1 * | 5/2013 | Temkine | G01K 7/01 |
| | | | 374/178 |
| 2013/0136149 A1 * | 5/2013 | Soenen | G01K 7/16 |
| | | | 374/170 |
| 2014/0086279 A1 * | 3/2014 | Cao | G01K 1/026 |
| | | | 374/183 |
| 2016/0306376 A1 * | 10/2016 | Nee | G05F 3/245 |
| 2018/0034447 A1 * | 2/2018 | Bertin | H03K 3/011 |

(Continued)

FOREIGN PATENT DOCUMENTS

| CN | 101404376 A | * | 4/2009 | |
| CN | 101430231 A | * | 5/2009 | ............. G01K 3/005 |
| CN | 103092236 A | * | 5/2013 | |

(Continued)

*Primary Examiner* — Gail Kaplan Verbitsky

(57) ABSTRACT

Embodiments of a device and method are disclosed. In an embodiment, a calibration circuit for a temperature sensor circuit includes a current source configured to generate a temperature independent reference current and further includes a voltage window generator circuit. The voltage window generator circuit is configured to generate a voltage window for the temperature sensor circuit using at least the temperature independent reference current. The voltage window is defined by a first reference voltage and a second reference voltage. The voltage window generator circuit is further configured to control a width of the voltage window to include a range of proportional to absolute temperature (PTAT) voltage outputs of a temperature sensor in the temperature sensor circuit.

18 Claims, 7 Drawing Sheets

(56) References Cited

U.S. PATENT DOCUMENTS

2020/0329325 A1\* 10/2020 Thukral ............... H04R 29/005

FOREIGN PATENT DOCUMENTS

| CN | 103984383 | A | \* | 8/2014 | ............... G05F 1/10 |
|----|-----------|---|---|--------|---------------------------|
| CN | 109916524 | A | \* | 6/2019 | |
| CN | 110366820 | A | \* | 10/2019 | ............... H03F 1/30 |
| DE | 102018108342 | A1 | \* | 10/2018 | ........... G01K 15/005 |
| EP | 3236224 | A1 | \* | 10/2017 | ........... G01K 15/005 |
| EP | 3236224 | B1 | \* | 12/2018 | ........... G01K 15/005 |
| KR | 20220069435 | A | \* | 5/2022 | |
| WO | WO-0146579 | A2 | \* | 6/2001 | ........... F02D 41/187 |

\* cited by examiner

SYSTEMS AND METHODS FOR CALIBRATING TEMPERATURE SENSORS

BACKGROUND

In wireless communication systems that use power amplifiers (PAs), such as radio frequency (RF) massive multi-input multi-output (mMIMO) systems, the operating temperature of the PAs may need to be monitored with high accuracy for optimum RF performance and product reliability. In such wireless communication systems, the bias of a PA may be adjusted based on the operating temperature to ensure acceptable linear performance over variable operating conditions, while maintaining good efficiency. Moreover, products implementing a PA may include smart controls that use the temperature of the PA as an input to ensure that the product operates within reliable parameters (e.g., within proper operating temperatures) and to prevent damage of the wireless communication hardware.

In view of the above, there is a need for temperature sensor calibration circuits that improve the accuracy of temperature sensors.

SUMMARY

Embodiments of a device and method are disclosed. In an embodiment, a calibration circuit for a temperature sensor circuit includes a current source configured to generate a temperature independent reference current and further includes a voltage window generator circuit. The voltage window generator circuit is configured to generate a voltage window for the temperature sensor circuit using at least the temperature independent reference current, wherein the voltage window is defined by a first reference voltage and a second reference voltage. The voltage window generator circuit is further configured to control a width of the voltage window to include a range of proportional to absolute temperature (PTAT) voltage outputs of a temperature sensor in the temperature sensor circuit.

In an embodiment, the calibration circuit further includes a pedestal circuit configured to generate an offset voltage that increases or decreases the first and second reference voltages.

In an embodiment, the voltage window generator circuit controls the width of the voltage window based on a first digital control input, and the pedestal circuit generates the offset voltage based on a second digital control input.

In an embodiment, the pedestal circuit includes a digital-to-analog converter (DAC) that outputs the offset voltage based on a digital control input, wherein the offset voltage is configured to cancel a common mode offset error introduced by the temperature sensor circuit.

In an embodiment, the voltage window generator circuit includes a resistor network. The resistor network may include a plurality of resistors having different resistance values, and a plurality of logic-controlled switches coupled to the plurality of resistors.

In an embodiment, the temperature independent reference current flows through at least one resistor of the plurality of resistors, and the width of the voltage window is approximately equal to a voltage drop across the at least one resistor.

In an embodiment, the voltage window generator circuit controls each of the plurality of logic-controlled switches based on a digital control input.

In an embodiment, the current source includes a bandgap voltage reference circuit and a voltage-controlled current source. The bandgap voltage reference circuit generates a reference voltage that is temperature independent, and the voltage-controlled current source converts the reference voltage to the temperature independent reference current.

In an embodiment, the voltage window generator circuit is further configured to provide the first reference voltage and the second reference voltage to an analog to digital converter (ADC) in the temperature sensor circuit. The first reference voltage may be a maximum voltage that the ADC is capable of encoding and the second reference voltage may be a minimum voltage that the ADC is capable of encoding.

In an embodiment, a calibration circuit for a temperature sensor circuit is disclosed. The calibration circuit includes a current source configured to generate a temperature independent reference current, and further includes a voltage window generator circuit. The voltage window generator circuit is configured to receive a first digital control input and a second digital control input from a processing circuit. The voltage window generator circuit is further configured to generate a voltage window for the temperature sensor circuit based on the first digital control input and the temperature independent reference current. The voltage window is defined by a first reference voltage and a second reference voltage. The calibration circuit further includes a pedestal circuit configured to generate an offset voltage that increases or decreases the first and second reference voltages based on the second digital control input.

In an embodiment, a width of the voltage window includes a range of proportional to absolute temperature (PTAT) voltage outputs of a temperature sensor in the temperature sensor circuit.

In an embodiment, the voltage window generator circuit controls the width of the voltage window based on the first digital control input.

In an embodiment, the voltage window generator circuit includes a resistor network. The resistor network includes a plurality of resistors having different resistance values, and a plurality of logic-controlled switches coupled to the plurality of resistors.

In an embodiment, the temperature independent reference current flows through at least one resistor of the plurality of resistors. In this embodiment, a width of the voltage window is approximately equal to a voltage drop across the at least one resistor.

In an embodiment, the voltage window generator circuit controls each of the plurality of logic-controlled switches based on the first digital control input.

In an embodiment, the pedestal circuit includes a digital-to-analog converter (DAC) that generates the offset voltage based on the second digital control input. The offset voltage may be configured to cancel a common mode offset error introduced by the temperature sensor circuit.

In an embodiment, the current source includes a bandgap voltage reference circuit and a voltage-controlled current source. The bandgap voltage reference circuit generates a reference voltage that is temperature independent, and the voltage-controlled current source converts the reference voltage to the temperature independent reference current.

In an embodiment, the voltage window generator circuit is further configured to provide the first reference voltage and the second reference voltage to an analog to digital converter (ADC) in the temperature sensor circuit. The first reference voltage is a maximum voltage that the ADC is capable of encoding and the second reference voltage is a minimum voltage that the ADC is capable of encoding.

In an embodiment, a radio frequency (RF) power amplifier device is disclosed. The RF power amplifier device includes an RF power amplifier circuit and a bias circuit coupled to the RF power amplifier circuit. The bias circuit is configured to provide a bias voltage to the RF power amplifier circuit. The bias circuit includes a temperature sensor circuit and a calibration circuit for the temperature sensor circuit. The calibration circuit includes a current source configured to generate a temperature independent reference current and a voltage window generator circuit. The voltage window generator circuit is configured to generate a voltage window for the temperature sensor circuit using at least the temperature independent reference current, wherein the voltage window is defined by a first reference voltage and a second reference voltage. The voltage window generator circuit is further configured to control a width of the voltage window to include a range of proportional to absolute temperature (PTAT) voltage outputs of a temperature sensor in the temperature sensor circuit. The bias circuit further includes a bias voltage control circuit configured to receive digital temperature data from the temperature sensor circuit and to control the bias voltage based on the digital temperature data.

In an embodiment, a method of operating a calibration circuit for a temperature sensor circuit is disclosed. The method involves generating a temperature independent reference current, generating a voltage window for the temperature sensor circuit using at least the temperature independent reference current, wherein the voltage window is defined by a first reference voltage and a second reference voltage, and controlling the width of the voltage window to include a range of proportional to absolute temperature (PTAT) voltage outputs of a temperature sensor in the temperature sensor circuit.

In an embodiment, the method further involves generating an offset voltage that increases or decreases the first and second reference voltages.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
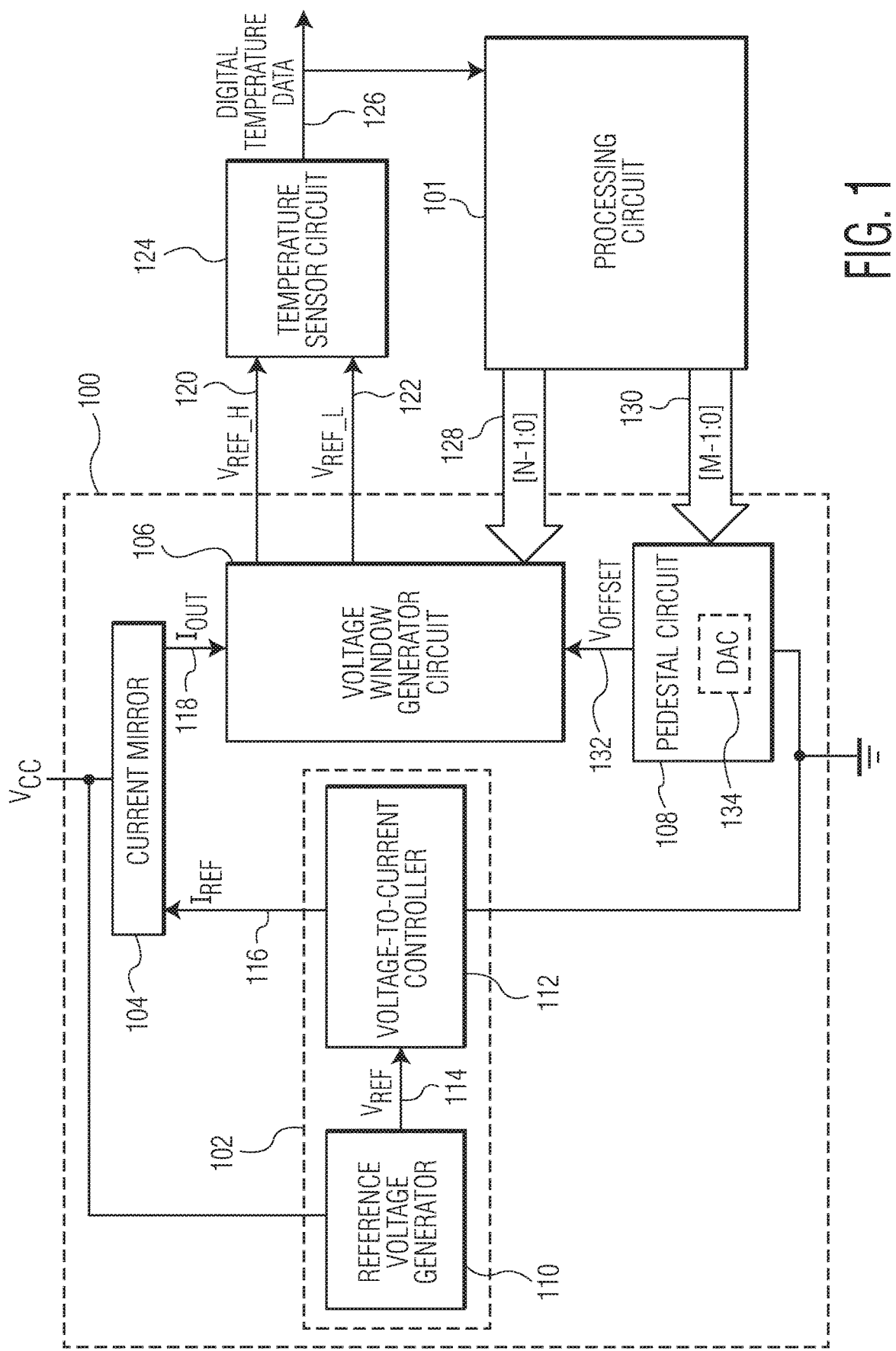
FIG. 1 depicts an exemplary block diagram of a calibration circuit for a temperature sensor in accordance with various embodiments of the disclosure.

FIG. 1 depicts an exemplary block diagram of a calibration circuit 100 for a temperature sensor in accordance with various embodiments of the disclosure. In an embodiment, the calibration circuit 100 may be implemented in a radio frequency (RF) power amplifier (PA) circuit and may be used to calibrate one or more temperature sensor circuits configured to sense the temperature of the PA circuit. As shown in FIG. 1, the calibration circuit 100 includes a current source 102, a current mirror 104, a voltage window generator circuit 106, and a pedestal circuit 108. The current source 102 and the current mirror 104 may be powered by a direct current (DC) supply voltage (e.g., $V_{CC}$). In an embodiment, the current source 102 may include a reference voltage generator 110 and a voltage-to-current controller 112. The reference voltage generator 110 may generate a reference voltage $V_{REF}$ 114 and may provide the reference voltage $V_{REF}$ 114 to the voltage-to-current controller 112. The voltage-to-current controller 112 may generate a temperature independent reference current $I_{REF}$ 116 based on the reference voltage $V_{REF}$ 114. The current source 102 is described in greater detail with reference to FIG. 2.

Figure 2:
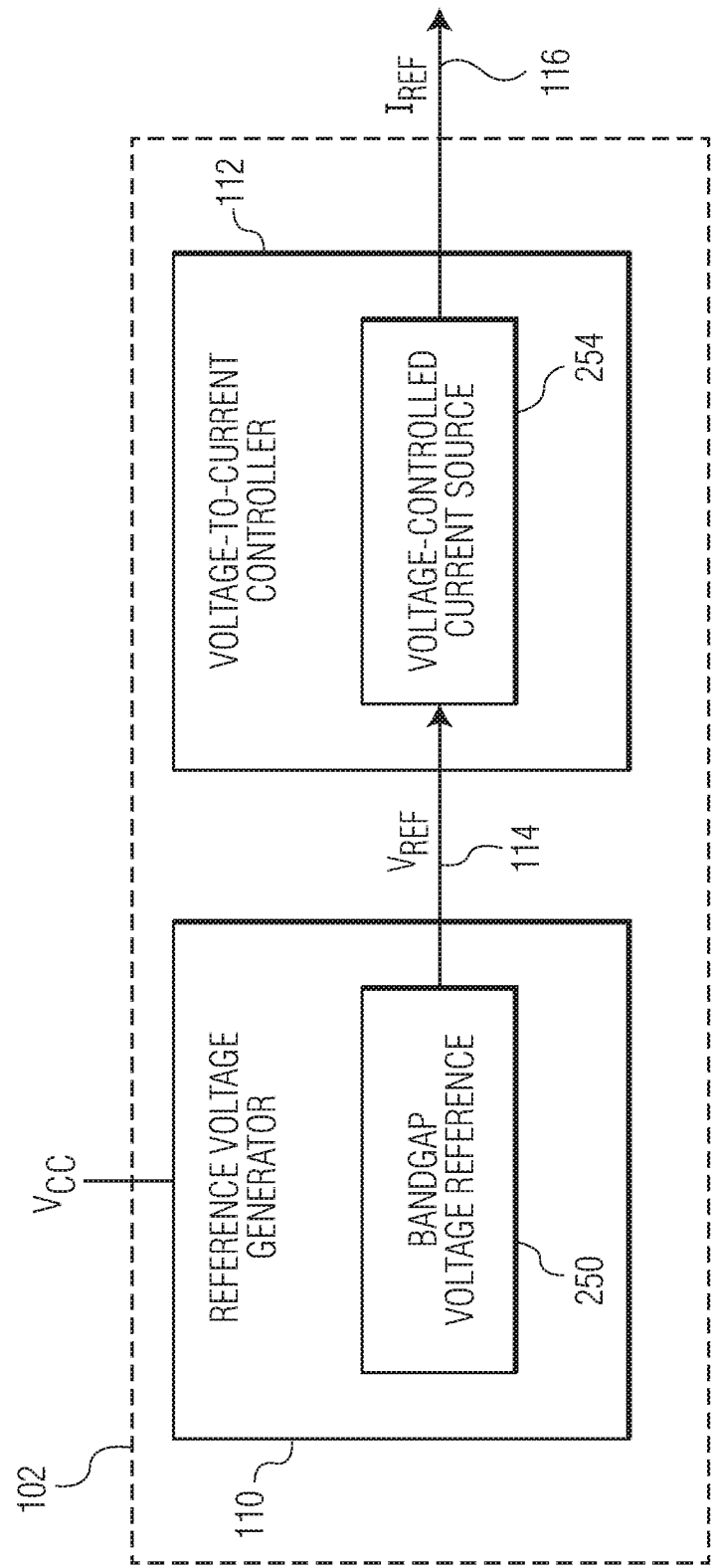
FIG. 2 depicts an example implementation of a current source in accordance with various embodiments of the disclosure.

FIG. 2 depicts an example implementation of the current source 102 shown in FIG. 1. As shown in FIG. 2, the reference voltage generator 110 may include a bandgap voltage reference circuit 250, and the voltage-to-current controller 112 may include a voltage-controlled current source 254. The bandgap voltage reference circuit 250 may generate a reference voltage (e.g., $V_{REF}$ 114) that is temperature independent and may provide the reference voltage (e.g., $V_{REF}$ 114) to the voltage-controlled current source 254. The voltage-controlled current source 254 may convert the reference voltage (e.g., $V_{REF}$ 114) to the temperature independent reference current $I_{REF}$ 116.

Referring back to FIG. 1, the current mirror 104 may generate an output current $I_{OUT}$ 118 that is approximately equal to the temperature independent reference current $I_{REF}$ 116, and may provide the output current $I_{OUT}$ 118 to the voltage window generator circuit 106. Therefore, given that output current $I_{OUT}$ 118 is approximately equal to the temperature independent reference current $I_{REF}$ 116, the output current $I_{OUT}$ 118 may also be referred to as a temperature independent reference current. In an embodiment, the voltage window generator circuit 106 may generate a voltage window that is defined by a high reference voltage ($V_{REF\_H}$) 120 and a low reference voltage ($V_{REF\_L}$) 122 in response to the output current $I_{OUT}$ 118. As shown in FIG. 1, the voltage window generator circuit 106 may provide the high reference voltage ($V_{REF\_H}$) 120 and the low reference voltage ($V_{REF\_L}$) 122 to the temperature sensor circuit 124. Since the high reference voltage ($V_{REF\_H}$) 120 and the low reference voltage ($V_{REF\_L}$) 122 are generated using the temperature independent output current $I_{OUT}$ 118, the high reference voltage ($V_{REF\_H}$) 120 and the low reference voltage ($V_{REF\_L}$) 122 may remain substantially stable despite significant temperature changes (e.g., temperature variations within a range of −40° C. to 125° C.) in the environment of the calibration circuit 100.

Figure 3:
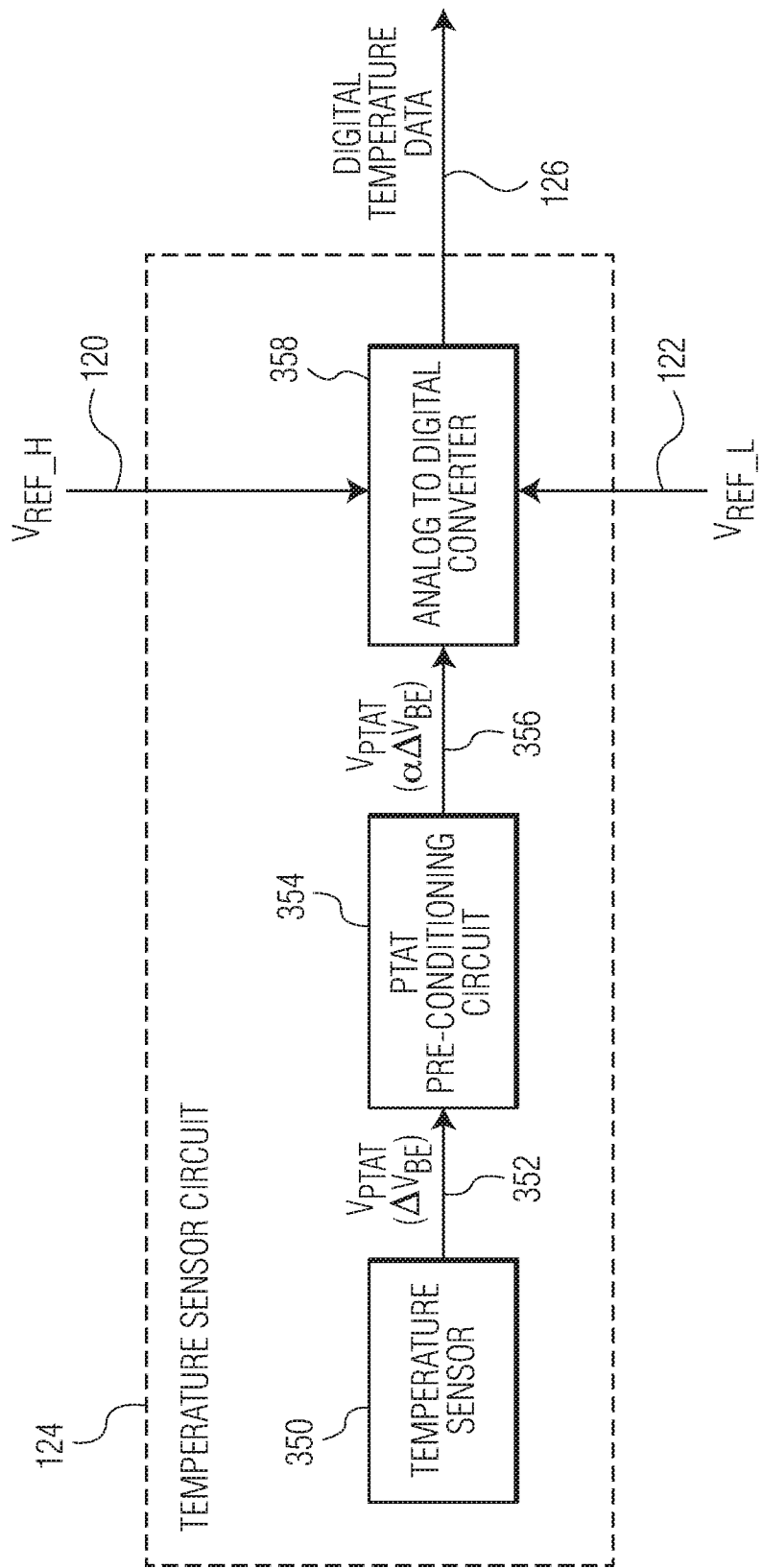
FIG. 3 depicts an example implementation of a temperature sensor circuit in accordance with various embodiments of the disclosure.

In an embodiment, and as shown in FIG. 3, the temperature sensor circuit 124 may include a temperature sensor 350, a PTAT pre-conditioning circuit 354, and an analog-to-digital converter (ADC) 358 that is configured to encode the amplified voltage outputs from the temperature sensor 350. In an embodiment, the temperature sensor 350 may include at least one diode-connected transistor (e.g., a bipolar junction transistor (BJT) where the base is shorted to the collector). In some examples, the voltage output 352 from the temperature sensor 350 may be proportional to absolute temperature (PTAT). Accordingly, in these examples, the voltage output 352 may be referred to as a PTAT voltage ($V_{PTAT}$).

In an embodiment, the temperature sensor 350 may output a PTAT voltage ($V_{PTAT}$) 352 by obtaining a first base-emitter voltage (e.g., $V_{BE\_1}$) of a first diode-connected transistor operating at a first current density and a second base-emitter voltage (e.g., $V_{BE\_2}$) of a second diode-connected transistor operating at a second current density, where the first and second diode-connected transistors are matched. The difference between the first base-emitter voltage (e.g., $V_{BE\_1}$) and the second base-emitter voltage (e.g., $V_{BE\_2}$) (also expressed as $\Delta V_{BE}$) may represent the PTAT voltage ($V_{PTAT}$) 352.

In some embodiments, the PTAT pre-conditioning circuit 354 may amplify the PTAT voltage ($V_{PTAT}$) 352 (e.g., $\Delta V_{BE}$) by an amplification factor α (also referred to as a gain factor α) to raise the PTAT voltage ($V_{PTAT}$) 352 (e.g., $\Delta V_{BE}$) to a practical voltage level for the input of the ADC 358. For example, α may be a number that is greater than one, such as 15. As shown in FIG. 3, the amplified PTAT voltage ($V_{PTAT}$) 356 (e.g., $\alpha \Delta V_{BE}$) may be provided to the ADC 358, which may convert the amplified PTAT voltage ($V_{PTAT}$) 356 to digital temperature data 126. In some embodiments, to obtain accurate results from the ADC 358, the PTAT pre-conditioning circuit 354 may shift (e.g., offset) the voltage level of the PTAT voltage ($V_{PTAT}$) 352 to be within the dynamic range of the ADC 358.

In an embodiment, the digital temperature data 126 may be an n-bit digital value that is a digital representation of the magnitude of the amplified PTAT voltage ($V_{PTAT}$) 356. Since the amplified PTAT voltage ($V_{PTAT}$) 356 may correspond to a temperature sensed by the temperature sensor 350, the n-bit digital value representing the magnitude of the amplified PTAT voltage ($V_{PTAT}$) 356 may be used to indicate the temperature sensed by the temperature sensor 350.

Figure 4:
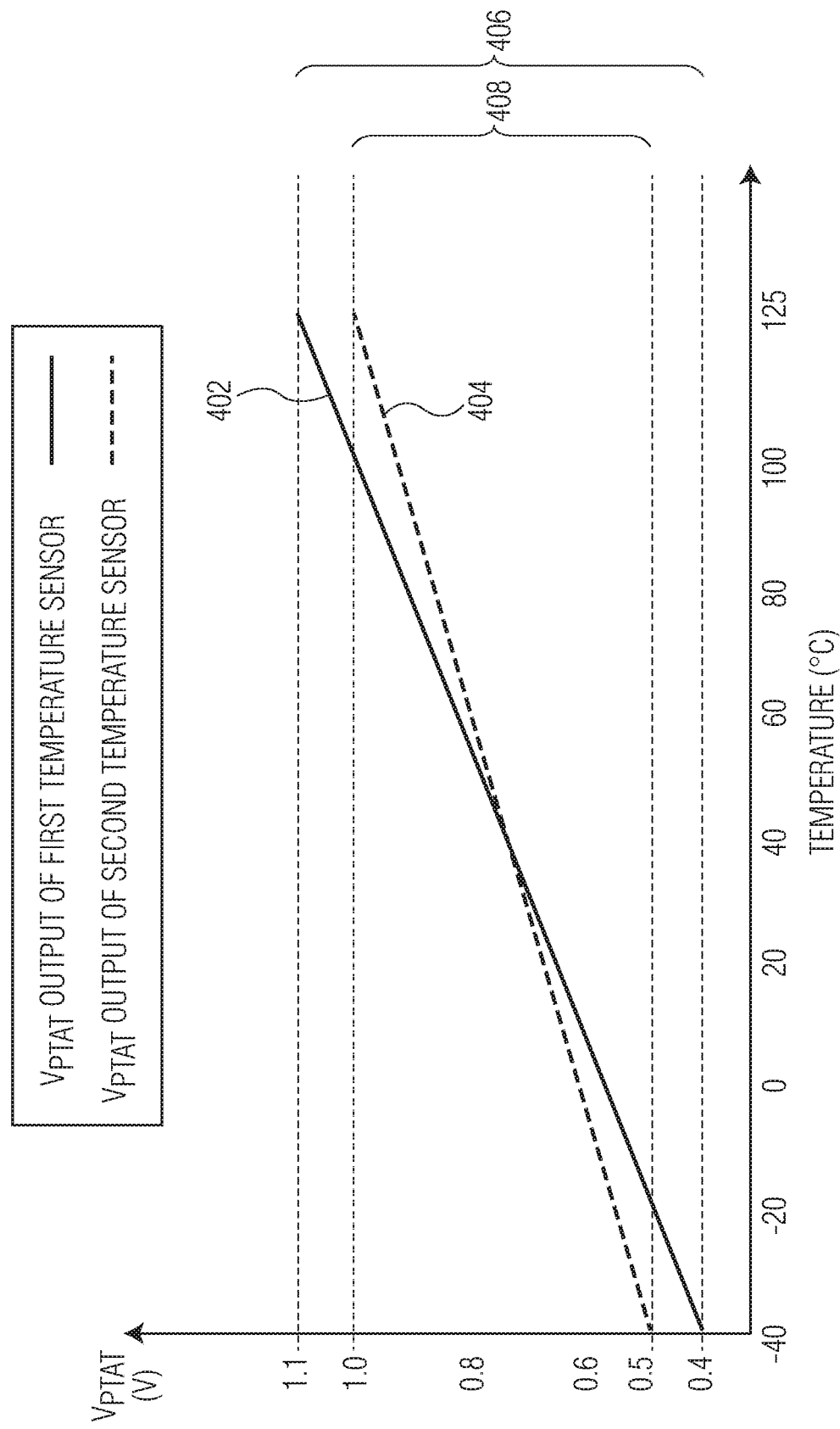
FIG. 4 depicts example proportional to absolute temperature (PTAT) slopes of first and second temperature sensors.

It should be noted that the range of PTAT voltages (e.g., a range of amplified PTAT voltages for a certain range of temperatures) from different temperature sensors may vary because the temperature sensors may have different PTAT slopes. The PTAT slope of a temperature sensor may refer to the PTAT voltage versus temperature characteristic (e.g., expressed as an amount of voltage per unit temperature) of the temperature sensor. For purposes of illustration, FIG. 4 shows example PTAT slopes 402, 404 of first and second temperature sensors. For example, as indicated by the first PTAT slope 402 in FIG. 4, the first temperature sensor may have a range 406 of amplified PTAT voltage ($V_{PTAT}$) values from 0.4V to 1.1V for the range of temperature values −40° C. to 125° C. As indicated by the second PTAT slope 404 in FIG. 4, the second temperature sensor may have a range 408 of amplified PTAT voltage ($V_{PTAT}$) values from 0.5V to 1.0V for the range of temperature values −40° C. to 125° C. Although only two PTAT slopes are shown in FIG. 4 for ease of illustration and description, it should be understood that the embodiments described herein may apply to other PTAT slopes that may be different from those shown in FIG. 4.

Referring back to FIG. 3, the ADC 358 may convert the amplified PTAT voltage ($V_{PTAT}$) values 356 to digital temperature data 126 based on high and low reference voltage values provided to the ADC 358. Therefore, to obtain accurate results from the ADC 358, the high reference voltage ($V_{REF\_H}$) 120 provided to the ADC 358 should be as close as possible to the maximum voltage value that the analog input on the ADC 358 will receive, while the low reference voltage ($V_{REF\_L}$) 122 provided to the ADC 358 should be as close as possible to the minimum voltage value that the analog input on the ADC 358 will receive. In other words, the high reference voltage ($V_{REF\_H}$) 120 and the low reference voltage ($V_{REF\_L}$) 122 may respectively serve as the upper and lower extremes of the voltages that the ADC 358 is capable of encoding (e.g., the maximum and minimum voltages that can be encoded by the ADC 358). Therefore, in one example, if the temperature sensor 350 includes the first temperature sensor associated with the PTAT slope 402 with the range 406 (e.g., 0.4V to 1.1V) of amplified PTAT voltage ($V_{PTAT}$) values as described with reference to FIG. 4, the high reference voltage ($V_{REF\_H}$) 120 may be set to 1.1V and the low reference voltage ($V_{REF\_L}$) 122 may be set to 0.4V to obtain accurate results from the ADC 358. It should be noted that if the temperature sensor 350 includes the second temperature sensor associated with the PTAT slope 404 with the range 408 (e.g., 0.5V to 1.0V)

of amplified PTAT voltage ($V_{PTAT}$) values as described with reference to FIG. 4, the high reference voltage ($V_{REF\_H}$) 120 set to 1.1V and the low reference voltage ($V_{REF\_L}$) 122 set to 0.4V may still cover the range 408 (e.g., 0.5V to 1.0V) and enable accurate results from the ADC 358.

Referring back to FIG. 1, in one embodiment, the voltage window generator circuit 106 may control (e.g., increase or decrease) the width of the voltage window (e.g., also referred to as the gain of the voltage window generator circuit 106) in response to a first digital control input 128. For example, and as explained in greater detail with reference to FIG. 5, the first digital control input 128 may be an N-bit digital value and the voltage window generator circuit 106 may generate the high reference voltage ($V_{REF\_H}$) 120 and the low reference voltage ($V_{REF\_L}$) 122 based on the N-bit digital value. In an embodiment, the voltage window generator circuit 106 may receive the first digital control input 128 from a processing circuit 101. In some embodiments, the processing circuit 101 may set and/or adjust the first digital control input 128 based on the digital temperature data 126 received from the temperature sensor circuit 124. In some embodiments, the first digital control input 128 (e.g., the N-bit digital value) may be a default value based on prior testing and/or calibration procedures performed on the temperature sensor 350. For example, the processing circuit 101 may be a central processing unit (CPU) of a wireless communication device (e.g., a smartphone, tablet, personal computer, etc.). The operation of the voltage window generator circuit 106 will now be described with reference to FIG. 5.

Figure 5:
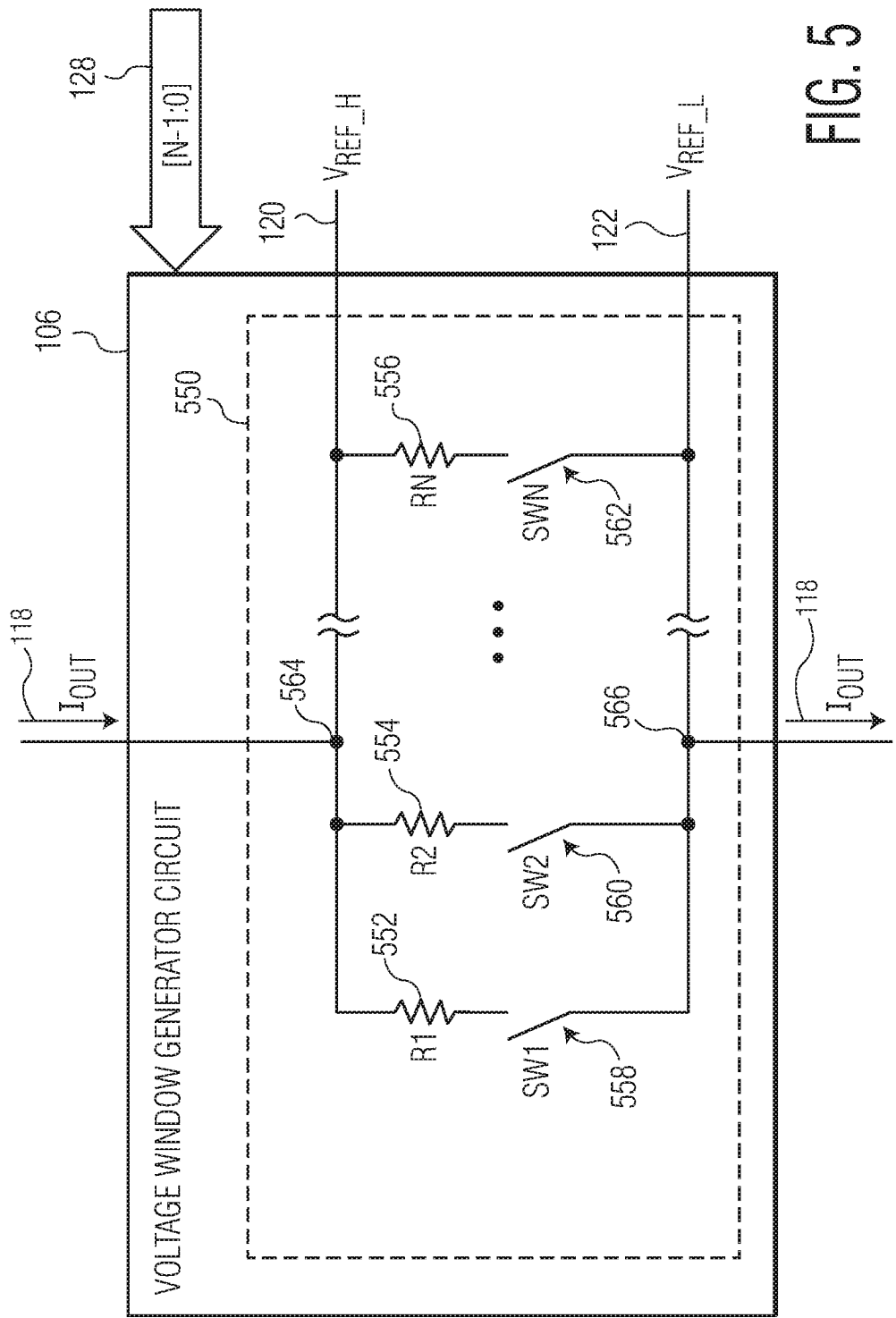
FIG. 5 depicts an example implementation of a voltage window generator circuit in accordance with various embodiments of the disclosure.

FIG. 5 depicts an example implementation of the voltage window generator circuit 106 in accordance with various embodiments of the disclosure. As shown in FIG. 5, the voltage window generator circuit 106 may include a resistor network 550 configured to receive the output current $I_{OUT}$ 118 and to output the voltage drop across the resistor network 550 (e.g., the voltage drop from node 564 to node 566). As further shown in FIG. 5, the resistor network 550 may include an N number of resistors (e.g., resistors R1 552, R2 554, RN 556) coupled to an N number of logic-controlled switches (e.g., switches SW1 558, SW2 560, SWN 562). In some examples, each of the N number of resistors (e.g., resistors R1 552, R2 554, RN 556) may have a different resistance value. In other embodiments, some or all of the N resistors may have the same resistance value.

In an embodiment, each of the logic-controlled switches SW1 558, SW2 560, SWN 562 may be implemented as a transistor switch that can be closed in response to a logic input value '1' or opened in response to a logic input value '0', or vice versa. For example, the value of each bit in the N-bit digital value of the first digital control input 128 may control a corresponding one of the N number of logic-controlled switches (e.g., switches SW1 558, SW2 560, SWN 562). In FIG. 5, for example, the first digital control input 128 is expressed with the notation [N−1:0] indicating that the first digital control input 128 may be a digital value including a set of N bits starting at bit 0 and ending at bit N−1. For example, N may be an integer that is greater than or equal to one. Therefore, in one example implementation, the most significant bit (e.g., bit N−1) in the N-bit digital value may serve as the logic input value that controls the first switch (e.g., SW1 558) in the resistor network 550 and the least significant bit (e.g., bit 0) may serve as the logic input value that controls the Nth switch (e.g., SWN 562) in the resistor network 550.

In one example, if the resistor network 550 is configured to include three resistors and three logic-controlled switches (e.g., N=3), and if the first digital control input 128 is the 3-bit digital value '100', the voltage window generator circuit 106 may close the switch SW1 558 and open the switches SW2 560 and SWN 562. When one of the N number of logic-controlled switches are closed (e.g., when SW1 558 is closed) and the remaining logic-controlled switches are opened, the output current $I_{OUT}$ 118 may flow through the resistor corresponding to the closed switch (e.g., R1 552). The width of the voltage window (e.g., the range of voltages between $V_{REF\_H}$ 120 and $V_{REF\_L}$ 122) may be approximately equal to the amount of the voltage drop (e.g., expressed as $I_{OUT} \times R1$) across the corresponding resistor (e.g., R1 552). Therefore, the voltage window generator circuit 106 may control (e.g., increase or decrease) the voltage window by using the logic-controlled switches to control the flow of the output current $I_{OUT}$ 118 through resistors (e.g., resistors R1 552, R2 554, RN 556) of different resistance values.

In an embodiment, the voltage window generator circuit 106 may control the width of the voltage window (e.g., the values of $V_{REF\_H}$ 120 and $V_{REF\_L}$ 122) based on one or more of the PTAT voltages that may be output from the temperature sensor 350. The width of the voltage window may be the voltage range between the high reference voltage ($V_{REF\_H}$) 120 and the low reference voltage ($V_{REF\_L}$) 122. For example, the voltage range between the high reference voltage ($V_{REF\_H}$) 120 and the low reference voltage ($V_{REF\_L}$) 122 may be the difference between the high reference voltage ($V_{REF\_H}$) 120 and the low reference voltage ($V_{REF\_L}$) 122. Therefore, in one example scenario, if the high reference voltage ($V_{REF\_H}$) 120 is 1.0V and the low reference voltage ($V_{REF\_L}$) 122 is 0.5V, the width of the voltage window may be 0.5V (e.g., 1.0V−0.5V=0.5V). In this example scenario, as an illustration, if the high reference voltage ($V_{REF\_H}$) 120 is increased from 1.0V to 1.1V and the low reference voltage ($V_{REF\_L}$) 122 is decreased from 0.5V to 0.4V, the width of the voltage window would be increased to 0.7V.

In an embodiment, with reference to FIGS. 1 and 3, if the temperature sensor 350 is implemented using diode-connected BJTs, then the voltage window generator circuit 106 may control the width of the voltage window (e.g., the values of $V_{REF\_H}$ 120 and $V_{REF\_L}$ 122) to cover (e.g., include) a specific range of PTAT voltages corresponding to the temperature values −40° C. to 125° C. Accordingly, the voltage window generator circuit 106 may set the value of $V_{REF\_H}$ 120 to be approximately equal to a maximum PTAT voltage that the ADC 358 may receive as an input and may set the value of $V_{REF\_L}$ 122 to be approximately equal to a minimum PTAT voltage that the ADC 358 may receive as an input. In one example, the voltage window may cover the previously described range 406 of amplified PTAT voltage ($V_{PTAT}$) values from 0.4V to 1.1V. Accordingly, the voltage window generator circuit 106 may set the value of $V_{REF\_H}$ 120 to be approximately equal to 1.1V and may set the value of $V_{REF\_L}$ 122 to be approximately equal to 0.4V. In another example, the voltage window may cover the previously described range 408 of amplified PTAT voltage ($V_{PTAT}$) values from 0.5V to 1.0V. Accordingly, the voltage window generator circuit 106 may set the value of $V_{REF\_H}$ 120 to be approximately equal to 1.0V and may set the value of $V_{REF\_L}$ 122 to be approximately equal to 0.5V.

Considering that different temperatures sensors (e.g., local BJT temperature sensors in an integrated circuit (IC) device or IC "chip" and remote BJT temperature sensors located outside the IC chip) may generate a different range of PTAT voltages for the same set of temperature values (e.g., temperature values −40° C. to 125° C.), the voltage window generator circuit 106 may ensure that the values of $V_{REF\_H}$ 120 and $V_{REF\_L}$ 122 provided to the ADC 358 cover the range of PTAT voltages (e.g., the amplified PTAT voltage ($V_{PTAT}$) values 356) of a particular temperature sensor (e.g., temperature sensor 350). As such, the voltage window generated by the voltage window generator circuit 106 described herein may be used to calibrate the ADC 358 for a particular temperature sensor, thereby improving the accuracy of the digital temperature data 126 from the ADC 358.

Referring back to FIG. 1, the pedestal circuit 108 may be configured to adjust the voltage window (e.g., $V_{REF\_H}$ 120 and $V_{REF\_L}$ 122) by generating an offset voltage ($V_{OFFSET}$) 132 (also referred to as a base reference voltage). In an embodiment, the pedestal circuit 108 may increase both the high reference voltage ($V_{REF\_H}$) 120 and the low reference voltage ($V_{REF\_L}$) 122 as a function of the offset voltage ($V_{OFFSET}$) 132. For example, with reference to FIGS. 1 and 5, to set the high reference voltage ($V_{REF\_H}$) 120 and the low reference voltage ($V_{REF\_L}$) 122 to 1.1V and 0.4V, respectively, the voltage window generator circuit 106 may set the node 564 to 0.7V and may set the node 566 to 0V. This may be achieved by configuring one or more of the N number of logic-controlled switches (e.g., switches SW1 558, SW2 560, SWN 562) to obtain a voltage drop of 0.7V from node 564 to node 566, where node 566 is coupled to ground and the offset voltage ($V_{OFFSET}$) 132 is set to 0V. The pedestal circuit 108 may then provide an offset voltage ($V_{OFFSET}$) 132 of 0.4V at node 566, which may increase the high reference voltage ($V_{REF\_H}$) 120 from 0.7V to 1.1V and may increase the low reference voltage ($V_{REF\_L}$) 122 from 0V to 0.4V.

In one example scenario, due to common mode offset errors that may be introduced by the temperature sensor circuit 124, the high reference voltage ($V_{REF\_H}$) 120 and the low reference voltage ($V_{REF\_L}$) 122 may be 1.0V and 0.3V, respectively. If the offset voltage ($V_{OFFSET}$) 132 is set to 0.1V, then the high reference voltage ($V_{REF\_H}$) 120 and the low reference voltage ($V_{REF\_L}$) 122 may be adjusted to the desired voltage values 1.1V (e.g., 1.0V+0.1V) and 0.4V (e.g., 0.3V+0.1V), respectively. It should be noted that in some embodiments, the offset voltage ($V_{OFFSET}$) 132 may adjust the voltage window (e.g., $V_{REF\_H}$ 120 and $V_{REF\_L}$ 122) to compensate for common mode offset errors without changing the width of the voltage window (e.g., without changing the difference between the high reference voltage ($V_{REF\_H}$) 120 and the low reference voltage ($V_{REF\_L}$) 122).

In an embodiment, the pedestal circuit 108 may include an M-bit digital to analog converter (DAC) 134 that may be configured to generate the offset voltage ($V_{OFFSET}$) 132. For example, as shown in FIG. 1, the pedestal circuit 108 may receive a second digital control input 130. The second digital control input 130 may be an M-bit digital value. In FIG. 1, for example, the second digital control input 130 is expressed with the notation [M−1:0] indicating that the second digital control input 130 may be a digital value including a set of M bits starting at bit 0 and ending at bit M-1. For example, M may be an integer that is greater than or equal to one. The M-bit DAC 134 may generate a voltage (e.g., offset voltage ($V_{OFFSET}$) 132) corresponding to the second digital control input 130. In an embodiment, the pedestal circuit 108 may receive the second digital control input 130 (e.g., bits 0 to M-1) from the processing circuit 101. In some embodiments, the processing circuit 101 may set and/or adjust the second digital control input 130 based on the digital temperature data 126 received from the temperature sensor circuit 124. In some embodiments, the second digital control input 130 (e.g., the M-bit digital value) may be a default value based on prior testing and/or calibration procedures performed on the temperature sensor 350. In an embodiment, the second digital control input 130 (also referred to as a DAC trim) may be stored in a memory (e.g., a one time programmable (OTP) memory controlled by the processing circuit 101). In this embodiment, the pedestal circuit 108 may obtain the second digital control input 130 from the memory and may apply the second digital control input 130 to the M-bit DAC 134. In an embodiment, the M-bit DAC 134 may be implemented as a 4-bit DAC (e.g., M=4).

In an embodiment, the pedestal circuit 108 may adjust the offset voltage ($V_{OFFSET}$) 132 in fine granularity (e.g., <0.8° C.) and may control (e.g., increase or decrease) the high reference voltage ($V_{REF\_H}$) 120 and the low reference voltage ($V_{REF\_L}$) 122 in a synchronized way to cancel common mode offset errors. Such common mode offset errors may include an offset error caused by a thermal resistance from the temperature sensor (e.g., in the temperature sensor circuit 124) to a silicon die (e.g., a silicon die including a power amplifier (PA) circuit), a PTAT offset introduced by a silicon-germanium (SiGe) process variation and comparator mismatch errors in the ADC of the temperature sensor circuit 124, and/or other types of common mode offset errors. The final offset calibration accuracy may be half of the granularity, which may be less than 0.5° C.

Figure 6:
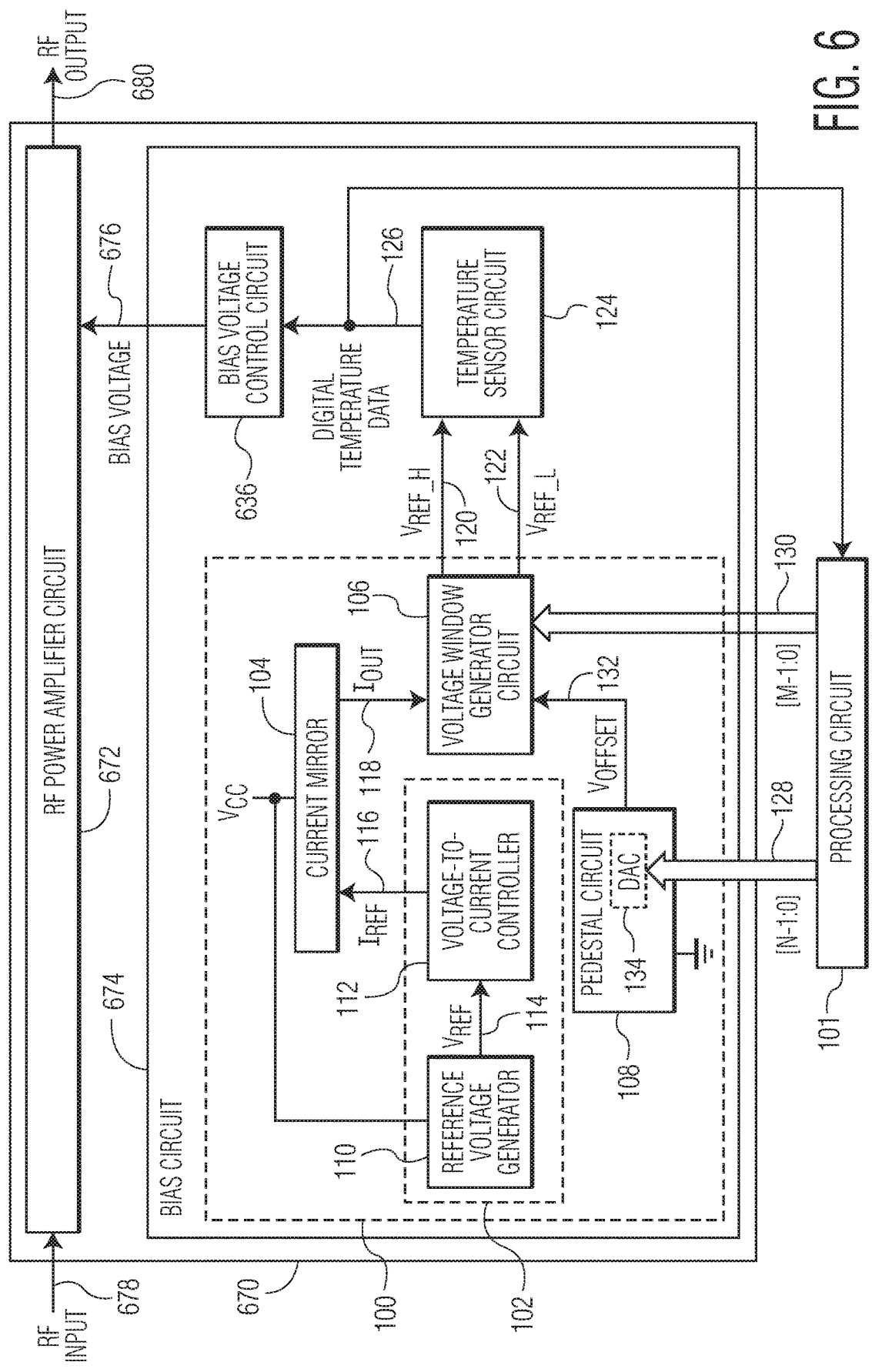
FIG. 6 depicts an exemplary block diagram of a radio frequency (RF) power amplifier device including a temperature sensor and a calibration circuit for the temperature sensor in accordance with various embodiments of the disclosure.

FIG. 6 depicts an exemplary block diagram of a radio frequency (RF) power amplifier device 670 including the temperature sensor circuit 124 and the calibration circuit 100 for the temperature sensor circuit 124 in accordance with various embodiments of the disclosure. As shown in FIG. 6, the RF power amplifier device 670 includes an RF power amplifier circuit 672 and a bias circuit 674. In an embodiment, the RF power amplifier circuit 672 and a bias circuit 674 may be included on a substrate of the RF power amplifier device 670. In an embodiment, the RF power amplifier circuit 672 may include one or more power transistors configured to amplify the RF input signal 678 and to produce an amplified RF output signal 680. In some embodiments, the RF power amplifier circuit 672 may be a Doherty amplifier circuit.

The bias circuit 674 may provide a bias voltage 676, via the bias voltage control circuit 636, to some or all of the one or more power transistors in the RF power amplifier circuit 672. As shown in FIG. 6, the bias voltage control circuit 636 may receive the digital temperature data 126 from the temperature sensor circuit 124 and may set the bias voltage 676 based on the digital temperature data 126. For example, if the bias voltage control circuit 636 receives digital temperature data 126 indicating that the current temperature of the RF power amplifier circuit 672 has exceeded a threshold, the bias voltage control circuit 636 may adjust (e.g., increase) the bias voltage 676 to ensure acceptable linear performance of the RF power amplifier circuit 672 under the current operating conditions, as well as to maintain efficiency. In other embodiments, the bias voltage control circuit 636 may perform one or more temperature management operations that may prevent overheating and/or damage to the hardware components (e.g., the power transistors in the RF power amplifier circuit 672) of the power amplifier device 670.

As described herein, the calibration circuit 100 may calibrate the temperature sensor circuit 124 by generating and providing a voltage window defined by the high reference voltage ($V_{REF\_H}$) 120 and the low reference voltage ($V_{REF\_L}$) 122. Also as described herein, the voltage window defined by the high reference voltage ($V_{REF\_H}$) 120 and the low reference voltage ($V_{REF\_L}$) 122 may ensure that the digital temperature data 126 accurately indicates the temperature sensed by the temperature sensor circuit 124. Since the bias voltage control circuit 636 relies on the digital temperature data 126 to make the appropriate adjustments to the bias voltage 676, the improved accuracy of the digital temperature data 126 resulting from the calibration circuit 100 may improve the performance of the RF power amplifier device 670.

Figure 7:
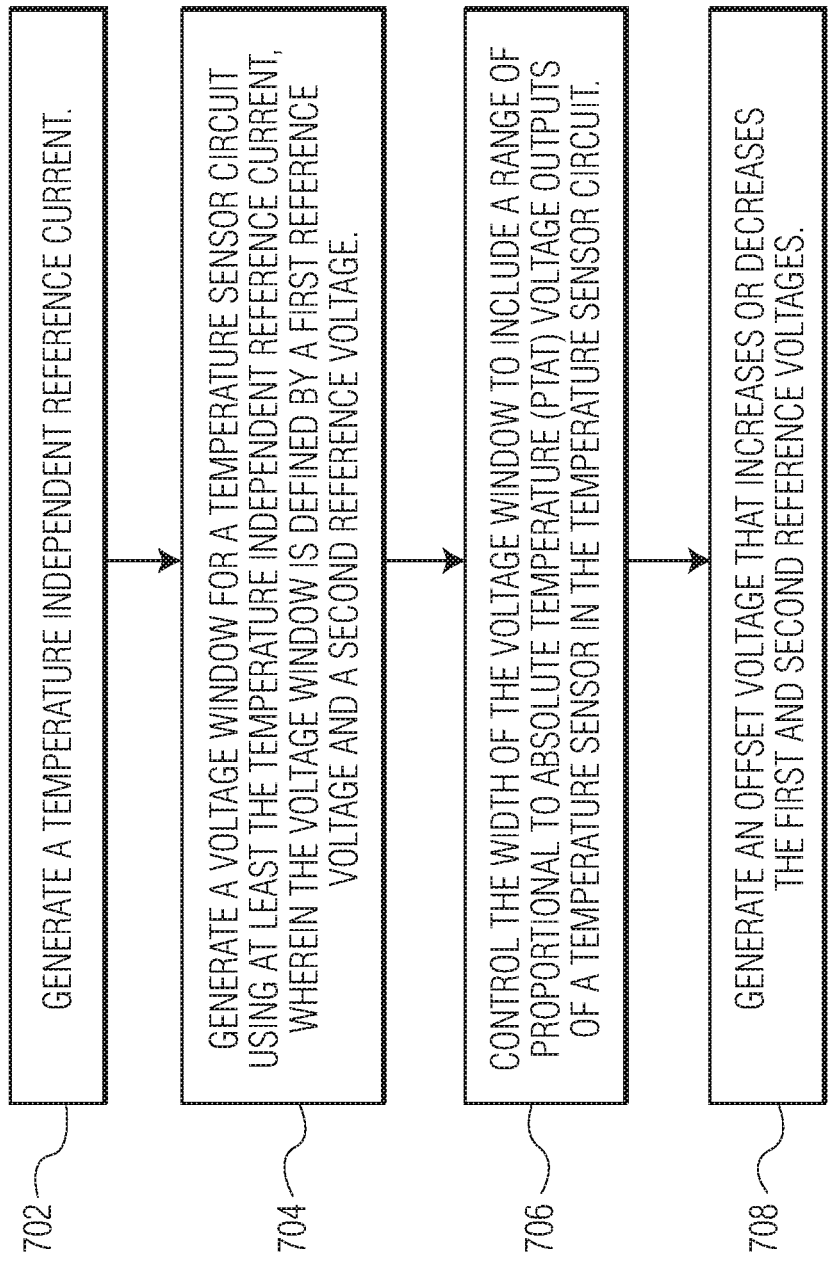
FIG. 7 is a flow diagram of a method for operating a calibration circuit for a temperature sensor circuit in accordance with various embodiments of the disclosure.

FIG. 7 is a flow diagram of a method for operating a calibration circuit (e.g., calibration circuit 100) for a temperature sensor circuit (e.g., temperature sensor circuit 124) in accordance with various embodiments of the disclosure. At block 702, the method involves generating a temperature independent reference current (e.g., temperature independent reference current $I_{REF}$ 116). At block 704, the method involves generating a voltage window for the temperature sensor circuit using at least the temperature independent reference current. The voltage window is defined by a first reference voltage (e.g., high reference voltage ($V_{REF\_H}$) 120) and a second reference voltage (e.g., low reference voltage ($V_{REF\_L}$) 122). At block 706, the method involves controlling the width of the voltage window to include a range of proportional to absolute temperature (PTAT) voltage outputs of a temperature sensor (e.g., temperature sensor 350) in the temperature sensor circuit. For example, the width of the voltage window may be defined by the voltage range between the high reference voltage ($V_{REF\_H}$) 120 and the low reference voltage ($V_{REF\_L}$) 122. At block 708, the method involves generating an offset voltage (e.g., offset voltage ($V_{OFFSET}$) 132) that increases or decreases the first and second reference voltages.

By using the voltage window (e.g., $V_{REF\_H}$ 120 and $V_{REF\_L}$ 122) of the calibration circuit 100 disclosed herein to calibrate a temperature sensor circuit, the temperature sensing accuracy of the temperature sensor circuit may be improved to ±3° C. over a 100° C. temperature range. Moreover, the M-bit DAC 134 (e.g., in the pedestal circuit 108) of the calibration circuit 100 may cancel common mode offset errors and may achieve high linearity (e.g., less than 0.3 least significant bit (LSB) differential nonlinearity (DNL) error). In some examples, the calibration circuit 100 may improve the accuracy of a temperature sensor circuit being used to monitor the operating temperature of a power amplifier (e.g., the power amplifier device 670), thereby enabling bias adjustments and other operations relying on accurate temperature measurements of the power amplifier to be properly performed. Such operations may include temperature management operations that prevent overheating and/or damage to the hardware components of the power amplifier. Furthermore, implementation of the calibration circuit 100 may be achieved within a small area on an IC chip and with low cost.

The preceding detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A calibration circuit for a temperature sensor circuit, the calibration circuit comprising:
   a current source configured to generate a temperature independent reference current; and
   a voltage window generator circuit configured to
      provide, to the temperature sensor circuit, a first reference voltage and a second reference voltage that define a voltage window for the temperature sensor circuit, wherein the first reference voltage and the second reference voltage are based on at least the temperature independent reference current, and a width of the voltage window is a voltage range between the first and second reference voltages, and increase or decrease the width of the voltage window, based on a received control input, to cover a range of proportional to absolute temperature (PTAT) voltage outputs of a temperature sensor in the temperature sensor circuit.

2. The calibration circuit of claim 1, further comprising:
a pedestal circuit configured to generate an offset voltage that increases or decreases the first and second reference voltages.

3. The calibration circuit of claim 2, wherein:
the voltage window generator circuit increases or decreases the width of the voltage window based on a first digital control input received by the calibration circuit, and
the pedestal circuit generates the offset voltage based on a second digital control input received by the calibration circuit.

4. The calibration circuit of claim 2, wherein the pedestal circuit comprises a digital-to-analog converter (DAC) that outputs the offset voltage based on a digital control input, wherein the offset voltage is configured to cancel a common mode offset error introduced by the temperature sensor circuit.

5. A calibration circuit for a temperature sensor circuit, the calibration circuit comprising:
a current source configured to generate a temperature independent reference current and
a voltage window generator circuit configured to
provide, to the temperature sensor circuit, a first reference voltage and a second reference voltage that define a voltage window for the temperature sensor circuit, wherein the first reference voltage and the second reference voltage are based on at least the temperature independent reference current, and a width of the voltage window is a voltage range between the first and second reference voltages, and
increase or decrease the width of the voltage window to cover a range of proportional to absolute temperature (PTAT) voltage outputs of a temperature sensor in the temperature sensor circuit,
wherein the voltage window generator circuit comprises a resistor network, wherein the resistor network includes:
a plurality of resistors having different resistance values, and
a plurality of logic-controlled switches coupled to the plurality of resistors.

6. The calibration circuit of claim 5, wherein the temperature independent reference current flows through at least one resistor of the plurality of resistors, and wherein the width of the voltage window is approximately equal to a voltage drop across the at least one resistor.

7. The calibration circuit of claim 6, wherein the voltage window generator circuit controls each of the plurality of logic-controlled switches based on a digital control input.

8. The calibration circuit of claim 1, wherein the current source includes a bandgap voltage reference circuit and a voltage-controlled current source, wherein the bandgap voltage reference circuit generates a reference voltage that is temperature independent, and wherein the voltage-controlled current source converts the reference voltage to the temperature independent reference current.

9. The calibration circuit of claim 1, wherein the voltage window generator circuit is further configured to provide the first reference voltage and the second reference voltage to an analog to digital converter (ADC) in the temperature sensor circuit, wherein the first reference voltage is a maximum voltage that the ADC is capable of encoding and the second reference voltage is a minimum voltage that the ADC is capable of encoding.

10. A calibration circuit for a temperature sensor circuit, the calibration circuit comprising:
a current source configured to generate a temperature independent reference current;
a voltage window generator circuit configured to
receive a first digital control input and a second digital control input from a processing circuit, and
generate a voltage window for the temperature sensor circuit based on the first digital control input and the temperature independent reference current, wherein the voltage window is defined by a first reference voltage and a second reference voltage, wherein the voltage window generator circuit comprises a resistor network, wherein the resistor network includes:
a plurality of resistors having different resistance values, and
a plurality of logic-controlled switches coupled to the plurality of resistors; and
a pedestal circuit configured to generate an offset voltage that increases or decreases the first and second reference voltages based on the second digital control input.

11. The calibration circuit of claim 10, wherein the temperature independent reference current flows through at least one resistor of the plurality of resistors, and wherein a width of the voltage window is approximately equal to a voltage drop across the at least one resistor.

12. The calibration circuit of claim 11, wherein the voltage window generator circuit controls each of the plurality of logic-controlled switches based on the first digital control input.

13. The calibration circuit of claim 10, wherein the pedestal circuit comprises a digital-to-analog converter (DAC) that generates the offset voltage based on the second digital control input, wherein the offset voltage is configured to cancel a common mode offset error introduced by the temperature sensor circuit.

14. The calibration circuit of claim 10, wherein the current source includes a bandgap voltage reference circuit and a voltage-controlled current source, wherein the bandgap voltage reference circuit generates a reference voltage that is temperature independent, and wherein the voltage-controlled current source converts the reference voltage to the temperature independent reference current.

15. The calibration circuit of claim 10, wherein the voltage window generator circuit is further configured to provide the first reference voltage and the second reference voltage to an analog to digital converter (ADC) in the temperature sensor circuit, wherein the first reference voltage is a maximum voltage that the ADC is capable of encoding and the second reference voltage is a minimum voltage that the ADC is capable of encoding.

16. A radio frequency (RF) power amplifier device comprising:
- an RF power amplifier circuit; and
- a bias circuit coupled to the RF power amplifier circuit, the bias circuit configured to provide a bias voltage to the RF power amplifier circuit, wherein the bias circuit includes:
  - a temperature sensor circuit;
  - a calibration circuit for the temperature sensor circuit, the calibration circuit including:
    - a current source configured to generate a temperature independent reference current; and
    - a voltage window generator circuit configured to
      - provide, to the temperature sensor circuit, a first reference voltage and a second reference voltage that define a voltage window for the temperature sensor circuit, wherein the first reference voltage and the second reference voltage are based on at least the temperature independent reference current, and a width of the voltage window is a voltage range between the first and second reference voltages, and
      - increase or decrease the width of the voltage window, based on a received control input, to cover a range of proportional to absolute temperature (PTAT) voltage outputs of a temperature sensor in the temperature sensor circuit; and
  - a bias voltage control circuit configured to receive digital temperature data from the temperature sensor circuit and to control the bias voltage based on the digital temperature data.

17. A method for operating a calibration circuit for a temperature sensor circuit, the method comprising:
- generating a temperature independent reference current;
- provide, to the temperature sensor circuit, a first reference voltage and a second reference voltage that define a voltage window for the temperature sensor circuit, wherein the first reference voltage and the second reference voltage are based on at least the temperature independent reference current, and a width of the voltage window is a voltage range between the first and second reference voltages; and
- increasing or decreasing the width of the voltage window, based on a received control input, to cover a range of proportional to absolute temperature (PTAT) voltage outputs of a temperature sensor in the temperature sensor circuit.

18. The method of claim 17, further comprising:
- generating an offset voltage that increases or decreases the first and second reference voltages.

* * * * *